United States Patent
Wray (10) Patent No.: US 10,448,490 B2
(45) Date of Patent: Oct. 15, 2019

(54) DISTRIBUTED LIGHTING CONTROL SYSTEM AND METHOD

(71) Applicant: Donald L. Wray, Ocala, FL (US)

(72) Inventor: Donald L. Wray, Ocala, FL (US)

(73) Assignee: USAI, LLC, New Windsor, NY (US)

(*) Notice: Subject to any disclaimer, the term of this patent is extended or adjusted under 35 U.S.C. 154(b) by 0 days.

(21) Appl. No.: 16/122,335

(22) Filed: Sep. 5, 2018

(65) Prior Publication Data
US 2019/0075635 A1    Mar. 7, 2019

Related U.S. Application Data

(60) Provisional application No. 62/554,243, filed on Sep. 5, 2017.

(51) Int. Cl.
*H05B 37/02* (2006.01)
*H05B 33/08* (2006.01)

(52) U.S. Cl.
CPC ..... *H05B 37/0272* (2013.01); *H05B 33/0854* (2013.01); *H05B 33/0857* (2013.01); *H05B 37/0218* (2013.01); *H05B 37/0227* (2013.01); *H05B 37/0254* (2013.01)

(58) Field of Classification Search
None
See application file for complete search history.

(56) References Cited

U.S. PATENT DOCUMENTS

| | | | | |
|---|---|---|---|---|
| 5,769,527 A | * | 6/1998 | Taylor | G05B 19/0421 315/316 |
| 7,109,668 B2 | * | 9/2006 | Pogodayev | H05B 41/245 315/224 |
| 7,777,427 B2 | * | 8/2010 | Stalker, III | G05F 1/00 315/291 |
| 8,143,811 B2 | * | 3/2012 | Shloush | H05B 37/0218 315/297 |
| 8,729,833 B2 | * | 5/2014 | Chemel | H05B 33/0854 315/308 |
| 8,742,686 B2 | * | 6/2014 | Zampini, II | H05B 33/0857 257/13 |
| 2006/0273741 A1 | * | 12/2006 | Stalker, III | G05F 1/00 315/291 |
| 2014/0028199 A1 | * | 1/2014 | Chemel | H05B 33/0854 315/152 |
| 2014/0265897 A1 | * | 9/2014 | Taipale | H05B 37/02 315/200 R |
| 2016/0127875 A1 | * | 5/2016 | Zampini, II | H04W 4/043 370/311 |
| 2018/0263095 A1 | * | 9/2018 | Wray | H05B 37/0245 |

* cited by examiner

*Primary Examiner* — Crystal L Hammond
(74) *Attorney, Agent, or Firm* — St. Onge Steward Johnston & Reens LLC (57) ABSTRACT

A highly configurable and flexible distributed lighting control system that includes a Digital Power Module (DPM) connected to at least one remote/distributed Fixture Control Module (FCM) that controls an associated LED light fixture. The LED light fixture including at least two LEDs that are independently controllable. The LED light fixture adapted to receive various control signals for controlling the at least two LEDs.

20 Claims, 6 Drawing Sheets

DISTRIBUTED LIGHTING CONTROL SYSTEM AND METHOD

FIELD OF THE INVENTION

The invention relates to a distributed lighting system and, more specifically, a distributed lighting control system and method.

BACKGROUND OF THE INVENTION

Distributed lighting systems typically have a central controller and have distributed/remote light fixtures connected to and controlled by the central controller, whereby the central controller receives power from a power source and receives control signals from one or more control inputs, and, in turn, provides power and control signals to the light fixtures. For example, multiple Light Emitting Diode (LED) light fixtures, which typically use a very small amount of electrical power as compared to "standard" light fixtures that use incandescent or fluorescent lamps, can be connected to central controller by low voltage wiring which provides both power and control to the LED light fixtures.

However, known control systems and techniques for controlling distributed lighting systems do not allow for configurable or programmable control schemes, or, at the very least, known systems provide very little flexibility and versatility.

SUMMARY OF THE INVENTION

What is needed then is a highly versatile distributed lighting control system that allows for precise control of a plurality of light fixtures in various zones, over a single low voltage channel.

It is further desired to provide a highly versatile distributed lighting control system that allows for precise control of a plurality of light fixtures arranged in various lighting zones, over multiple low voltage channels.

In one configuration the system relates to a highly configurable and flexible distributed lighting control system that may include a central controller, a Digital Power Module (DPM), which is coupled to at least one remote/distributed Fixture Control Module (FCM) that controls an associated light fixture (e.g., an LED light fixture). The DPM may comprise a plurality of lighting channels/ports, each of which may be connected to a plurality of FCMs. The DPM can include an Alternating Current (AC) input (e.g., 120V/277V), and a Direct Current (DC) output (e.g., 48V) for each lighting channel.

In one configuration, the DC power is transmitted to the FCMs via low-voltage wiring, such as a CAT 5/6/6E cable. The FCMs can be connected to the CAT 5/6/6E cable in parallel, in a daisy chain configuration. In this manner, failure of any single FCM (e.g., the FCM fails open) would not adversely affect any of the remaining FCMs (and therefore the other light fixtures) connected to the channel. The DPM also provides control signals to the FCMs, such as digital control signals (e.g., DMX), via the low-voltage wiring and/or wirelessly.

The DPM includes a processor and transmitter/transceiver for processing control inputs and for transmitting control signals to the FCM(s), for example via the low voltage wiring and/or wirelessly. The processor may comprise, without limitation, a microprocessor, a field programmable gate array, a digital signal processor, or a microcontroller, or the like. Each FCM is operable to receive the control signal(s) transmitted from the DPM and is operable to control drivers which drive the various color channels of the lighting fixture, which may include pulse-width modulation (PWM) and/or other methods and techniques. The FCMs can include a receiver/transceiver and processor for receiving and processing the control signals and for controlling the drivers. The FCMs may also be operable to transmit information and/or control signals to the DPM in the same manner.

In one configuration a system for distributed lighting control is provided comprising: a digital power module configured to connect to a source of electrical power, where the digital power module has a processor connected to a storage, a plurality of 0-10 volt inputs, a plurality of occupancy sensor inputs and at least one digital output. The distributed lighting control system further comprises a first fixture control module including an input and a lighting channel having a first lighting element. The distributed lighting control system is provided such that the lighting channel is addressable to any one of a plurality of addresses from a set of predefined addresses and the digital power module is adapted to send output control signals to the input of the first fixture control module to control the lighting element, in response to input control signals received over the inputs of the digital power module. The distributed lighting control system is further provided such that the digital power module has a first mode wherein the processor is configured to address the output control signals according to a first address table in the storage, where the first address table has a unique address from the set of predefined addresses for each unique combination of (a) the plurality of 0-10 volt inputs and (b) the plurality of occupancy sensor inputs. Thus, the distributed lighting control system can accommodate multiple light fixtures arranged in a large variety of zones.

In another configuration a system for distributed lighting control comprising a digital power module configured to connect to a source of electrical power, where the digital power module has a processor connected to a storage, a plurality of inputs and at least one digital output. The distributed lighting control system further comprises a first fixture control module including an input and a first lighting channel having a first lighting element. The distributed lighting control system is provided such that the first lighting channel is addressable to any one of a plurality of addresses from a set of predefined addresses and the digital power module is adapted to send output control signals to the input of the first fixture control module to control the lighting element, in response to input control signals received over the inputs of the digital power module. The distributed lighting control system is further provided such that the digital power module has a first mode wherein the processor is configured to address the output control signals according to a first address table in the storage, where the first address table has a unique address from the set of predefined addresses for each unique combination of the plurality of inputs.

Other objects of the invention and its particular features and advantages will become more apparent from consideration of the following drawings and accompanying detailed description.

DESCRIPTION OF THE INVENTION

Referring now to the drawings, wherein like reference numerals designate corresponding structure throughout the views. The following examples are presented to further illustrate and explain the present invention and should not be taken as limiting in any regard.

The DPM may, in one configuration, be provided with four analog 0-10V inputs, however, any number of inputs may be provided on a DPM, and other analog and/or digital inputs can be provided.

The 0-10V inputs on the DPM may, for example, comprise an output of a dimmer switch (such as a wall-mounted slide-type dimmer), or from a daylight sensor, or from an occupancy sensor, and the like. It will be understood by those of skill in the art that occupancy sensors are more typically contact closure inputs.

In one example, a DPM may receive inputs from all of a dimmer switch, a daylight sensor and an occupancy sensor. In this configuration, the DPM will be provided with a processor and logic to process and categorize the received input signals and to output lighting control signals. For example, the dimmer switch may provide a 0-10V input to the DPM based on user positioning of the slide switch. However, the DPM will also receive a signal from a daylight sensor that will function to "dim" the lights in a predetermined manner based on ambient light level detected in the space. Likewise, if the occupancy sensor does not detect movement and/or presence in the space for a predetermined period of time, it can send a signal to the DPM to shut all the lights off in its configured space (zone).

The DPM could further comprise a 24V DC power supply that is capable of supplying 5-500 mA of current to the sensors.

In one configuration, it may not be desired to control all the light fixtures in the space in the same manner. For example, the space may include a number of light fixtures positioned relatively close to exterior windows and other light fixtures that are positioned further away from the exterior windows. On a bright sunny day, the area closer to the exterior windows will be brighter than the areas further from the exterior windows. To account for this difference in ambient lighting levels in the space, the daylight sensor may function to "dim" the light fixtures closest to the exterior windows so that those areas are not over-lit. However, the user may want a number of different dimmer switches (e.g., three or more) to independently control various lights in the space. Still further, the user may want all the lights in the space to turn off if the occupancy sensor detects no movement or presence after a threshold period of time.

All the above-described control schemes are processed and coordinated by the DPM to control the various FCMs in the space. For example, a first zone (Zone 1) to be controlled may comprise all the light fixtures near the exterior windows. Other zones (Zones 2-4) may comprise a first area of the space over a desk, a second area of the space over a small conference table and accent lighting in the space. All of these areas are independently controlled from each other. Still a fifth zone (Zone 5) could comprise all the light fixtures in the space.

In this example, all of the fixtures would be split up between Zones 1-4, however, it is possible that some (but not all) of the light fixtures in Zones 2-4 may belong to Zone 1. All of the fixtures would belong to Zone 5. This example is provided for explanation and is not intended as limiting in any way.

It is further contemplated that light fixtures from multiple spaces (e.g., multiple different offices) may be connected to the same DPM. For example, it could be that all offices include a dimmer switch for controlling all the light fixtures in the space and an occupancy sensor. Multiple different control signals can be received and acted on by a single DPM to individually control the FCMs in the various spaces.

It is further contemplated that each LED light fixture may comprise multiple color channels corresponding to multiple colors that may be output by the associated LED fixture. For example, the LED light fixtures can comprise four (4) color channels corresponding to Red, Green, Blue, and White (RGBW) LEDs, which can be controlled in a manner to generate virtually any color of light. Alternatively, the light fixtures can comprise two (2) color channels corresponding to different white colors which can be controlled to generate different color temperatures of white light (e.g., warmer or cooler light). Other combinations of white and/or colored LEDs can also be provided.

The FCMs are provided with a plurality of predetermined, user-selectable addresses such that each color channel of the FCM may be set to any one of the predetermined addresses prior to and/or during (or after) installation. For example, where the system has 48 unique combinations of inputs and color channels, each color channel of the FCM could be settable to any one of forty-eight (48) addresses. The 48 addresses can correspond to the various unique combinations of inputs and color channels including, for example: four (4) 0-10 v inputs (D1, D2, D3, D4), three (3) occupancy sensors (O1, O2, O3) and four (4) color channels (RGBW), however other arrangements and possible combinations can be provided.

The DPM is provided with one or more tables (or data sets) of predetermined sets of addresses corresponding to the various unique combinations of inputs and color channels, for example as shown in Table 1 and Table 2. The DPM receives input controls from the various inputs, processes such input controls and then generates and sends appropriate control signals to the FCMs, which control signals are provided with addresses according to the predetermined sets of addresses in the table(s). In this manner, each FCM (and each color channel thereof) can be uniquely controlled based on the input logic desired based on assigned address and based on the defined zone where it is located. As used in this application, the term "table" is only used to refer to sets of data that may be saved in a storage and is accessible to retrieve an address to be transmitted along with a control signal. It is understood that data may be saved in many differing configurations and formats and the term "table" is used to show that the data is accessible and can be associated with a particular control signal(s).

The following tables are provided as examples of how the DPM and FCM could be programmed and are provided for reference only. As can be seen from Tables 1 and 2, the various FCMs may each have multiple color channels (e.g., four). Table 1 corresponds to systems having one manual control for each fixture (e.g., one manual control for either dimming or color selection), such as static white or dimming color changing light fixtures. Table 2 corresponds to systems having two manual controls for each fixture (e.g., a first manual control for dimming and a second manual control for color selection), such as dimmable tunable white dimming RGBW light fixtures.

TABLE 1

One Controller Input (e.g., Static White & Warm Glow ® Mode Mapping, etc.)

| | Controls | | FCM Addresses | | | |
|---|---|---|---|---|---|---|
| | Input 1 | Input 2 | Ch1 | Ch2 | Ch3 | Ch4 |
| Control input Combination | O1 | D1 | 1 | 2 | 3 | 4 |
| | | D2 | 5 | 6 | 7 | 8 |
| | | D3 | 9 | 10 | 11 | 12 |
| | | D4 | 13 | 14 | 15 | 16 |
| | O2 | D1 | 17 | 18 | 19 | 20 |
| | | D2 | 21 | 22 | 23 | 24 |
| | | D3 | 25 | 26 | 27 | 28 |
| | | D4 | 29 | 30 | 31 | 32 |
| | O3 | D1 | 33 | 34 | 35 | 36 |
| | | D2 | 37 | 38 | 39 | 40 |
| | | D3 | 41 | 42 | 43 | 44 |
| | | D4 | 45 | 46 | 47 | 48 |

As depicted in Table 1, the system (and in particular the DPM) can have a first mode wherein the DPM is configured to receive and process inputs and generate control signals independently for the various inputs (e.g., D1-D4), for example wherein the light fixtures (and FCMs) are controlled by one manual control such as one manual control for either dimming or color selection. As an example, a system with static white fixtures and/or dimming color changing light fixtures, which are intended to be controlled by one manual controller would be appropriate for this first mode. To provide for independent control from any of the various inputs, a unique data address is provided for each input (D1-D4).

TABLE 2

Two-Controller Input (e.g., Color Select ®, RGBW, etc.)

| | Controls | | FCM Addresses | | | |
|---|---|---|---|---|---|---|
| | Input 1 | Input 2 | Ch1 | Ch2 | Ch3 | Ch4 |
| Control input Combination | O1 | D1/D2 | 1 | 2 | 3 | 4 |
| | | D3/D4 | 9 | 10 | 11 | 12 |
| | O2 | D1/D2 | 17 | 18 | 19 | 20 |
| | | D3/D4 | 25 | 26 | 27 | 28 |
| | O3 | D1/D2 | 33 | 34 | 35 | 36 |
| | | D3/D4 | 41 | 42 | 43 | 44 |

As depicted in Table 2, the system and DPM can have a second mode wherein the DPM is configured to receive and process inputs from one or more groups of multiple inputs and to generate one or more control signals based on a combination of the signals from the multiple inputs. For example wherein the light fixtures (and FCMs) are controlled by two manual controls such as a first manual control for dimming and a second manual control for color selection, the system can be operable to receive and process inputs from one or more predetermined pairs of two inputs (e.g., D1/D2 and D3/D4) and to generate control signals based on a combination of the signals from the pairs of inputs. As an example, a system with dimming and color-selectable RGBW light fixtures or tunable white light fixtures, which are intended to be controlled by two manual controllers, would be appropriate for this second mode. To provide for combined control from any pair of inputs, a unique data address is provided for each predetermined pair (or group) of inputs (e.g., D1/D2 and D3/D4).

Preferably, the system and/or DPM can be configured into the first or second mode (or other modes) by any known means, including, a switch (e.g., rotary or dip) or via software or firmware, or other suitable means.

Preferably, the DPM is operable to sense connected inputs and the DPM will only send control signals to "valid" addresses for which the DPM has a predetermined address based on the presently connected inputs and the currently configured mode. For example, as shown in Table 1, if the system/DPM is in the first mode with an occupancy sensor connected to input O1 and two dimmer controls connected to inputs D1 and D2, the valid addresses would be 1-8 (which are all of the possible addresses for that combination of inputs) and the DPM preferably sends/broadcasts control signals to all of the valid addresses, where such control signals are based on a combination of control signals received from the DPM inputs associated with each such valid address. Such broadcast can occur regardless of the actual addresses of the FCMs. Alternatively, control signals can be broadcast to all addresses (valid or invalid). In either case, because the DPM is broadcasting control signals to multiple addresses, zone configurations of lighting fixtures/FCMs can be easily changed simply by changing the addresses of the FCMs.

The addresses for the color channels of the FCMs can be set by any known means, including, a switch (e.g., rotary or dip) or via software or firmware, or other suitable means. For example, each FCM can include an address selector, for example a seven-position DIP switch capable of being set any value 0-127. Each value of the DIP switch (including at least values 1-127) preferably configures the FCM to receive data addressed to a unique set of addresses, one for each of the color channels in the light fixture. For example as shown in Table 3, DIP switch setting 1 configures the FCM to receive data for the 4 color channels on addresses 1-4, respectively, whereas DIP switch setting 2 configures the FCM to receive data on addresses 5-8, respectively, and so on. Where there are 48 possible combinations of inputs and color channels, the DIP switch may be set to one of 12 settings, as shown in Table 3, to configure the FCM to receive data at the corresponding set of addresses (shown in Table 1). The remaining settings of the DIP switch (i.e., values 13-127) can likewise configure the FCM for further unique address sets, in the same manner and pattern, for additional combinations of inputs/color channels. Thus, preferably, the FCMs are capable of receiving data sent to addresses within an address space of at least 508 or 512 addresses.

TABLE 3

| DIP | CH1 | CH2 | CH3 | CH4 |
|---|---|---|---|---|
| 1 | 1 | 2 | 3 | 4 |
| 2 | 5 | 6 | 7 | 8 |
| 3 | 9 | 10 | 11 | 12 |
| 4 | 13 | 14 | 15 | 16 |
| 5 | 17 | 18 | 19 | 20 |
| 6 | 21 | 22 | 23 | 24 |
| 7 | 25 | 26 | 27 | 28 |
| 8 | 29 | 30 | 31 | 32 |
| 9 | 33 | 34 | 35 | 36 |
| 10 | 37 | 38 | 39 | 40 |
| 11 | 41 | 42 | 43 | 44 |
| 12 | 45 | 46 | 47 | 48 |

The following examples are presented to further illustrate and explain the present invention and should not be taken as limiting in any regard. Likewise, the illustrations and drawings are not provided to scale and are provided to further explain and illustrate the novel features of the invention.

Figure 1:
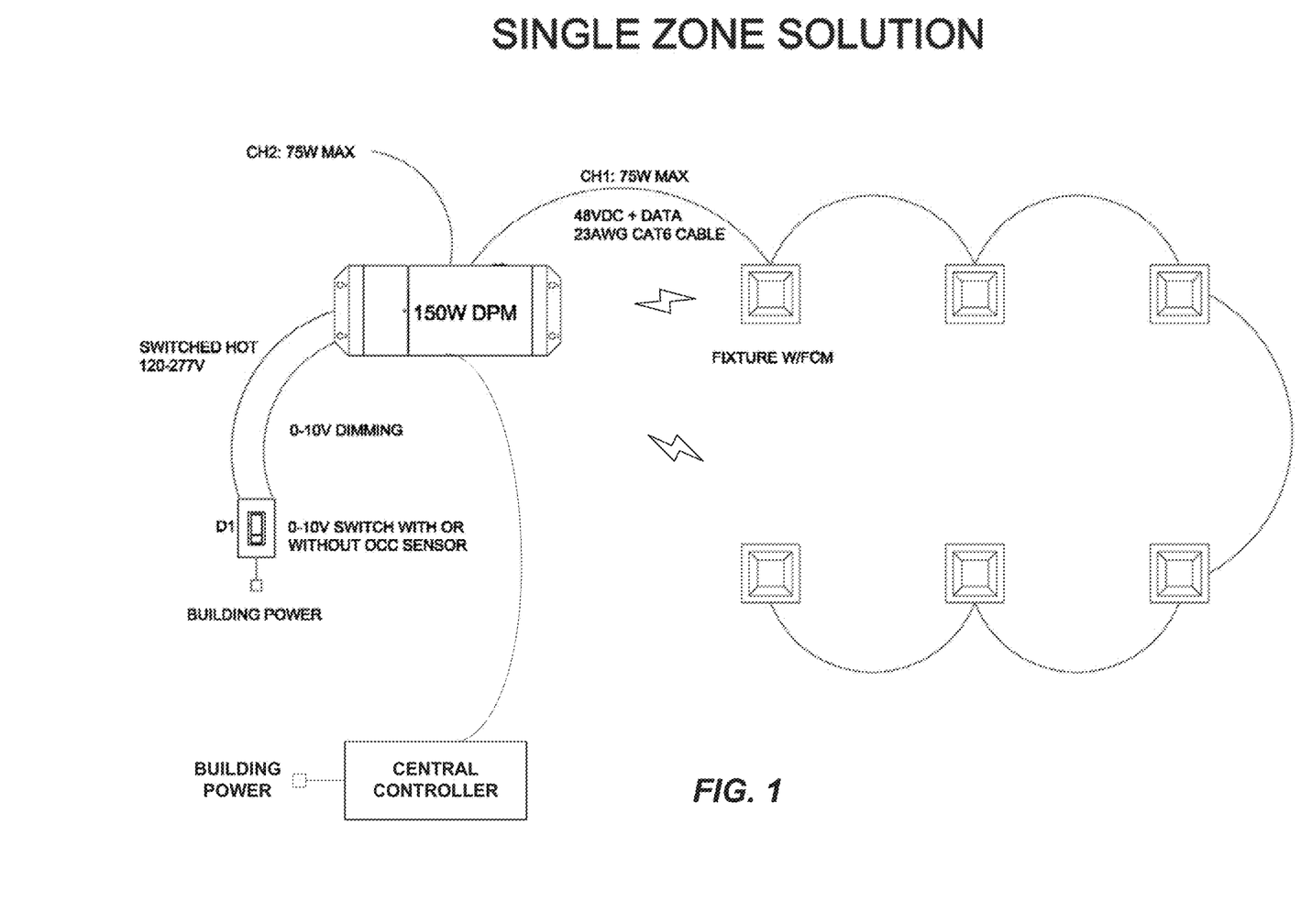
FIG. 1 is an example of a Single Zone configuration.

FIG. 1 depicts a single zone, single color-channel distributed lighting system including one 0-10V switch with or without an occupancy sensor. In this configuration, all of the light fixtures shown in the drawing—would be provided with the same address as all would be controlled identically. Since, in this example each light fixture has a single color channel, each FCM could be configured with a single address, such as address 1. If each light fixture has multiple color channels, each FCM could then be configured with multiple addresses. For example, if each light fixture has four color channels, each FCM could be configured with four addresses, such as addresses 1, 2, 3 and 4, as shown in Table 1. As discussed above, the DPM may be provided with a corresponding table including a data set of addresses for the combinations of inputs and color channels.

The DPM may, in one configuration, be able to provide up to 150 W of power. In one example, line power (e.g., 120V/277V) is provided to the dimmer switch from the building power distribution system, which is in turn, connected to the DPM. Additionally, a 0-10V signal is transmitted from the dimmer switch to the DPM as the dimmer control signal.

The DPM is illustrated showing the connection of six light fixtures to lighting channel one of the DPM. Lighting channel one can provide up to 75 W of power and transmits 48V DC and data to the various connected light fixtures. As the power transmitted on lighting channel one does not exceed 48 VDC, the connected light fixtures can be powered with, for example, a CAT6 cable. All the light fixtures are connected in parallel, in a daisy chain configuration as shown. The DPM is also able to provide up to 75 W of power (also 48 VDC on channel two). It should be noted, however, that any number of lighting channels could be provided.

Figure 2:
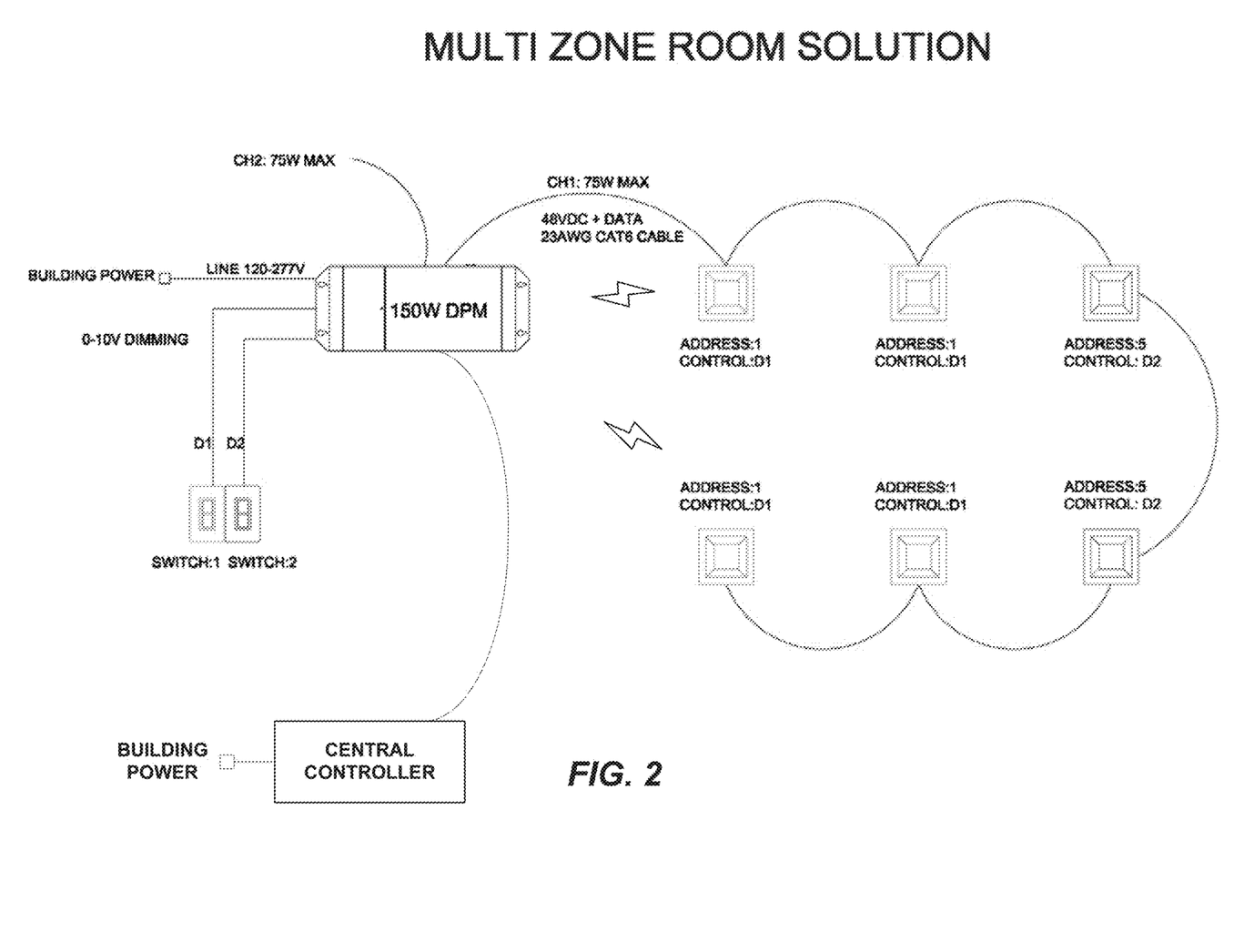
FIG. 2 is an example of a Multi Zone configuration.

Referring now to FIG. 2 a multi-zone, single color-channel distributed lighting system is depicted. In this case, electrical power from the building is provided directly to the DPM and two switches (dimmers) are illustrated. Like FIG. 1, there are a total of six light fixtures to be controlled in the space and they are all connected to channel one in a daisy chain configuration.

What differs from FIG. 1, however, is that a first set of four light fixtures depicted to the left are controlled separately (on switch 1, D1) from a second set of two light fixtures to the far right (on switch 2, D2).

It can be seen that a first set of four light fixtures (FCMs) that are controlled by switch 1 are provided with address number 1, while the second set of two light fixtures (FCMs) that are controlled by switch 2 are provided with address number 5. In this manner, each light fixture receives the correct control data based on the address of the FCM. In this scenario, each light fixture has a single color channel and thus only requires one address. If each light fixture has four color channels, then the first set of light fixtures could have addresses 1-4 while the second set could have addresses 5-8, as shown in table 1.

So, in the configuration depicted in FIG. 2, even though all the FCMs are connected to the same lighting channel from the DPM, the associated light fixtures are controlled individually based on their assigned addresses. This provides for exceptional versatility and flexibility as the distributed lighting control system can individually control a relatively large number of different lighting fixtures, configured in various zones, while being fed on the same lighting channel using a low voltage cable and low power consumption. Further, such zone configurations can easily be changed by altering the addresses of the addresses of the lighting fixtures/fixture control modules.

Figure 3:
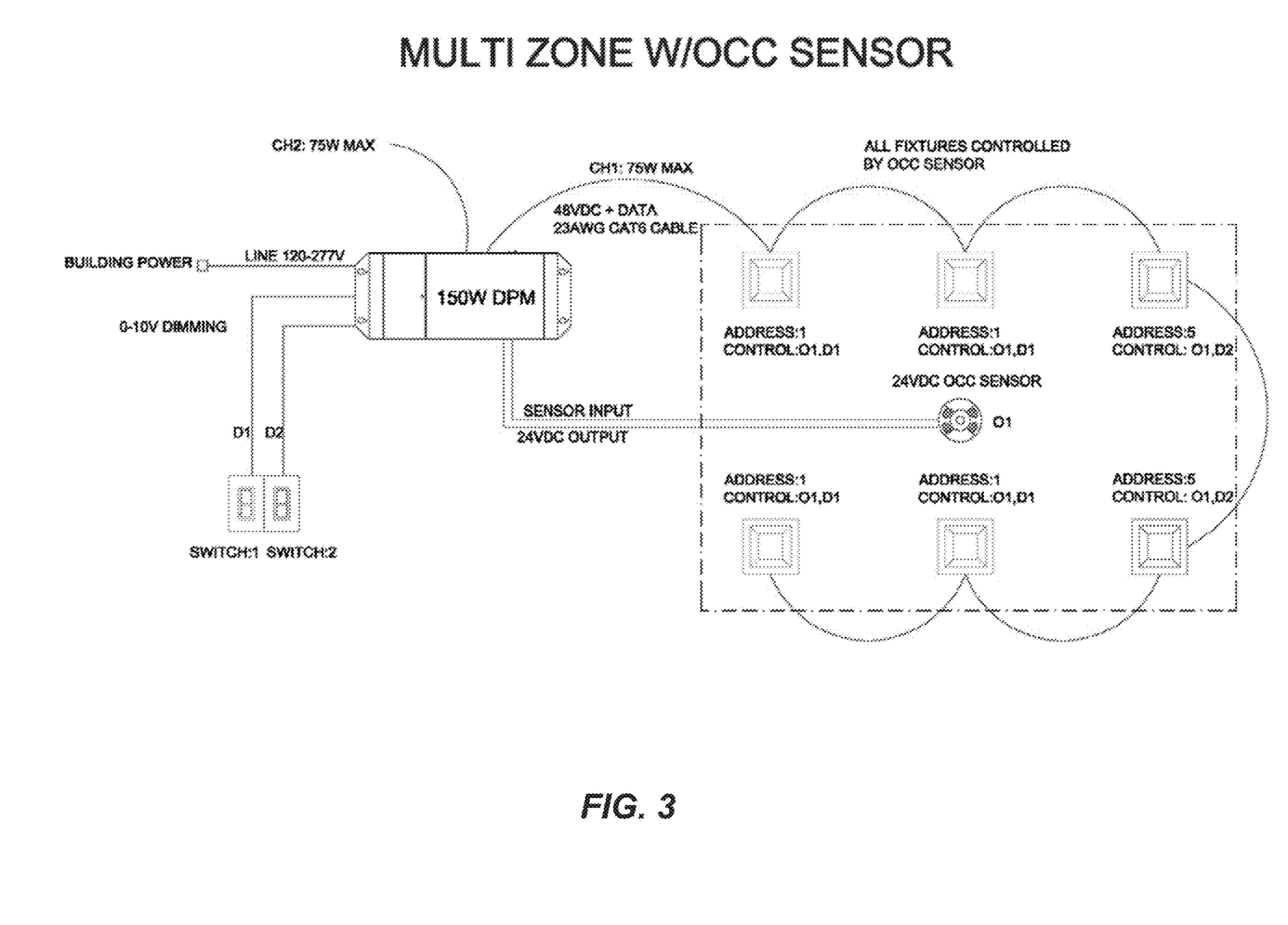
FIG. 3 is an example of a Multi Zone with Occupancy Sensor.

FIG. 3 depicts a multi zone, single color-channel distributed lighting system but also includes an occupancy sensor. The control scheme of FIG. 3 is similar to that discussed in connection with FIG. 2, however, this control scheme further includes an overriding occupancy sensor input signal (O1). Again, the versatility and flexibility of the system allows for the additional of many differing types of controls and zone configurations while not impacting power consumption nor losing the single low voltage channel to the fixtures.

As above, certain light fixtures are controlled by their associated switch (based on their address), but are also now controlled by the signal sent by the occupancy sensor. In this manner, if the occupancy sensor does not read movement in the space during a predefined time, the occupancy sensor will send a signal to the DPM that the lights should be turned OFF. The DPM would be programed such that the occupancy signal would be used to override the received switch or dimmer signals. In this example, all of the FCMs may be provided with the same address(es) as in the example of FIG. 2, all of which correspond to O1, as shown in Table 1.

Figure 4:
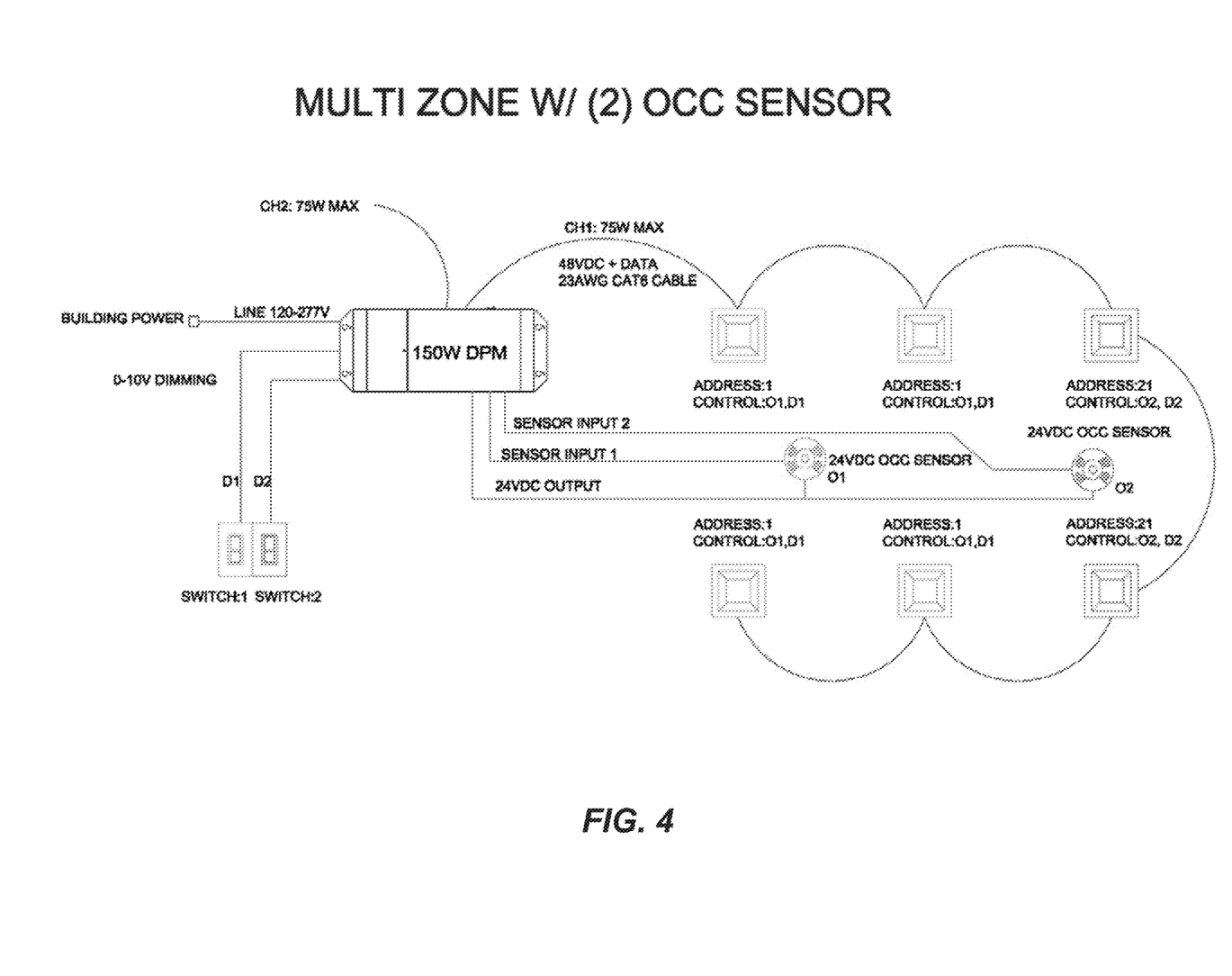
FIG. 4 is an example of a Multi Zone with Two Occupancy Sensors.

FIG. 4 is yet another configuration that provides further control inputs. In this configuration, the lights are controlled as discussed in connection with FIG. 2, however, there are now two occupancy sensors that control the lights in the space (O1 and O2). The FCM addresses are selected such that the first occupancy sensor is associated with the first switch and is used to override the signal sent from the first switch, whereas the second occupancy sensor is associated with the second switch and is used to override the signal sent from the second switch. As can be seen, the functionality of the various FCMs (light fixtures) is controlled based on the assigned address for each FCM. In particular, in this example, the light fixtures have one color channel and the first set of four light fixtures to the left are set to address 1, such that they are controlled by O1 and D1, and the second set of two light fixtures to the far right are set to address 21, such that they are controlled by O2 and D2. Again, if the light fixtures have multiple color channels, the FCMs may be set to multiple addresses, for example as provided in Table 1.

Figure 5:
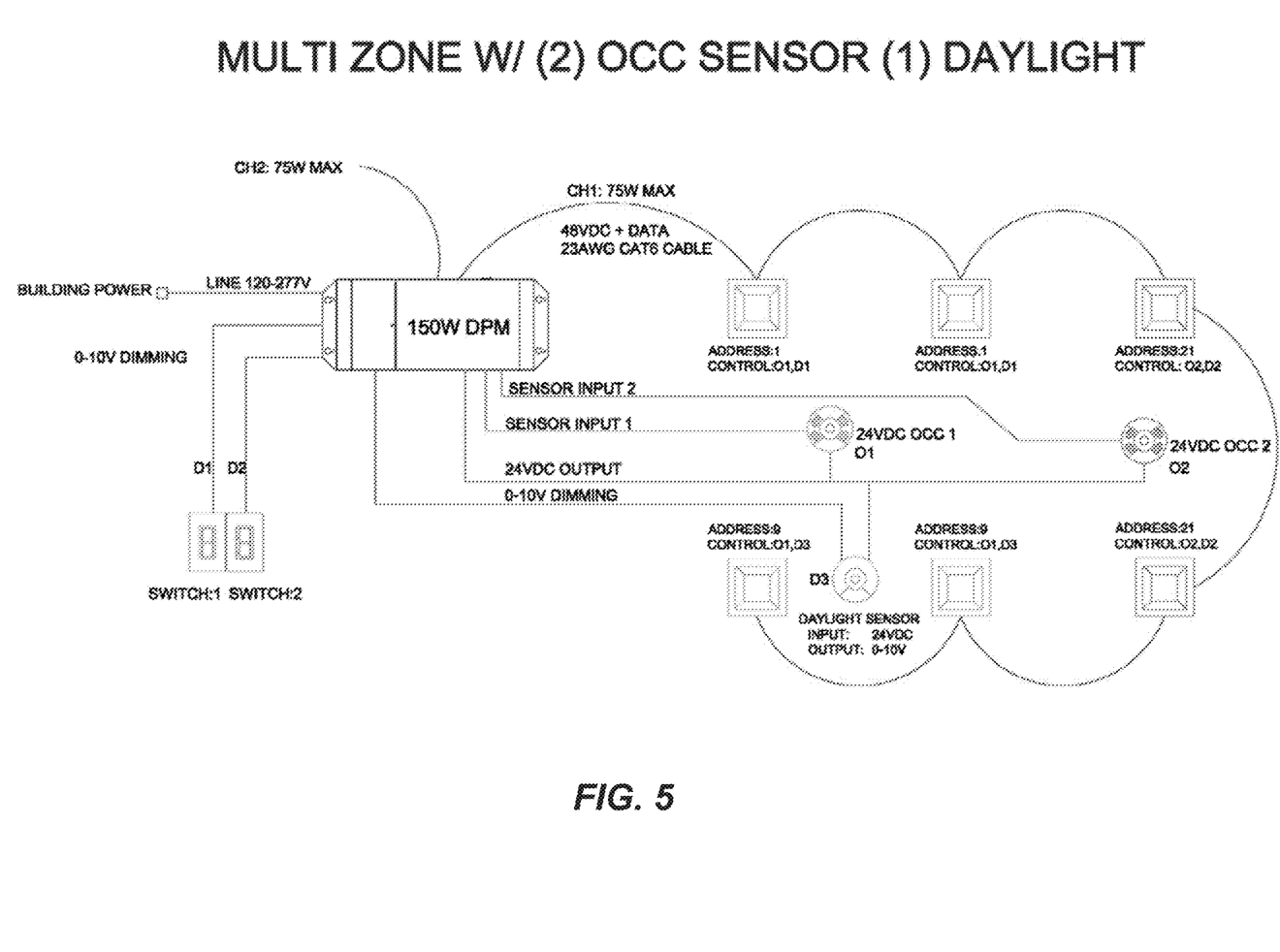
FIG. 5 is an example of a Multi Zone with Two Occupancy Sensors and One Daylight Sensor.

FIG. 5 is still another configuration of single a color-channel distributed lighting system that is similar to FIG. 4, but further includes a daylight sensor (D3). The daylight sensor is associated with and controls a third set of two fixtures physically positioned near the exterior windows (i.e., the two bottom fixtures to the left).

In this instance, the daylight sensor would measure the amount of ambient light in the space and if it is a bright sunny day, it would provide a control signal to the DPM that the power provided to the third set of two fixtures can be lowered such that the associated lights are dimmed. This particular functionality is provided by assigning a different address to the third set of two fixtures (e.g., they are changed from Address 1 to Address 9).

So, in this example, a first set of two light fixtures on the upper left hand side are controlled by switch one (D1) and occupancy sensor one (O1). As above, if the first occupancy sensor does not detect movement after a predefined period of time, the first set of light fixtures will be turned OFF. A second set of two light fixtures on the far right are controlled by switch two (D2) and occupancy sensor two (O2). The third set of two light fixtures are controlled by occupancy sensor one (O1) and the daylight sensor (D3). Thus, if the daylight sensor (D3) detects that the light level is higher than a threshold value, the third set of two light fixtures nearest the exterior windows will be dimmed by a predetermined percentage based on the light level detected. This will continue until the daylight sensor detects a light level that is at or below the threshold value or the two fixtures are turned completely OFF.

Again, the second set of two light fixtures on the far right of FIG. 5 are independently controlled from the first set of light fixtures. The second set of light fixtures are controlled by the second switch and the second occupancy sensor. It should be noted that while the two light fixtures to the right are not controlled by the daylight sensor, it would be possible to control, for example, one of the two light fixtures with the daylight sensor by changing the address of that light fixture.

Figure 6:
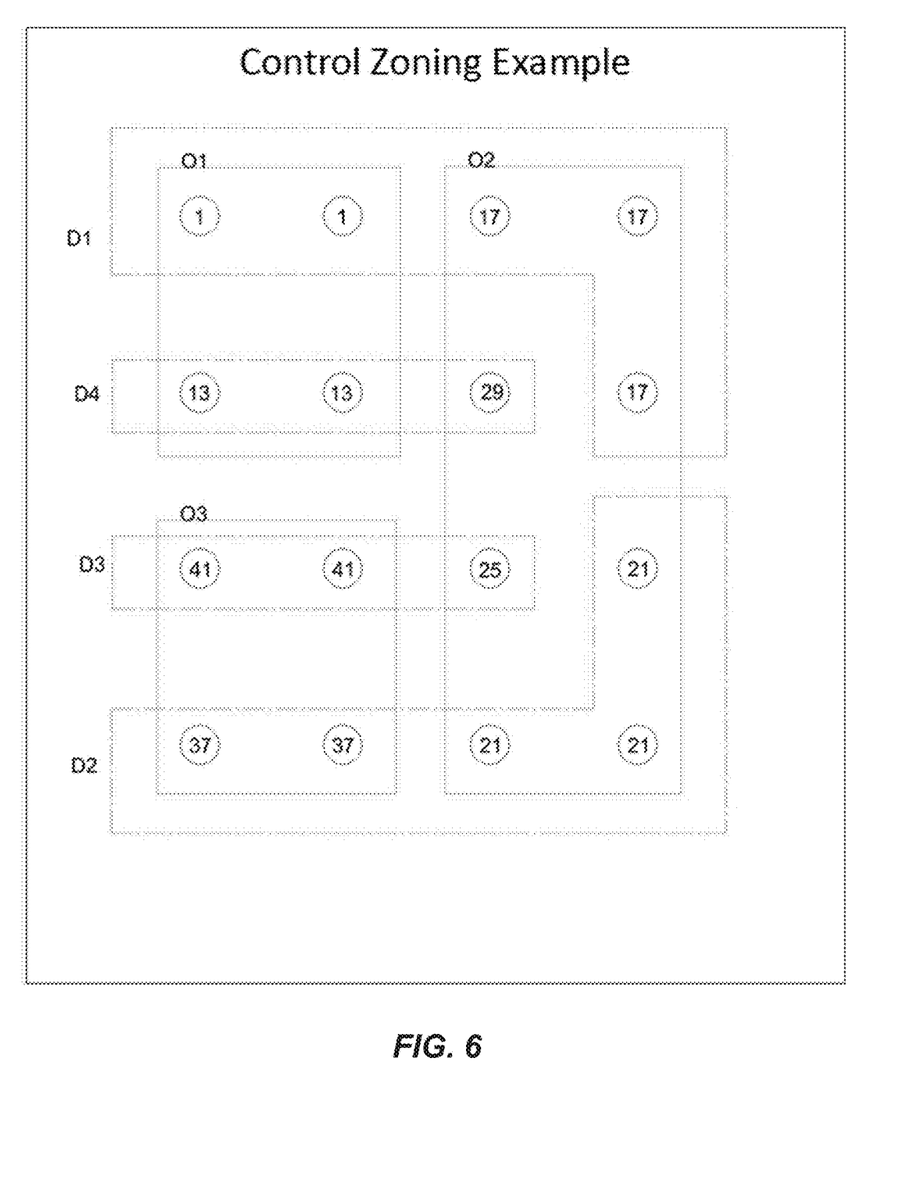
FIG. 6 is an example of a Control Zoning illustrating the addresses used to the various FCMs.

FIG. 6 is an example of another possible configuration of a distributed lighting system having single color channel light fixtures in a space that may be controlled in different manners. For example, D1 is an L-shaped grouping of light fixtures that is controlled by a first control input. D2 is another L-shaped grouping of light fixtures that is controlled by a second control input. Likewise, D3 and D4 are groupings of light fixtures (3 each) that are each controlled by a third and fourth control input, respectively. The D1-D4 controls may be, for example, some combination of dimmers and/or daylight sensors.

Further, it may be advantageous or desired to control some of the light fixtures in the D1 group and some of the light fixtures in D4 group together in a group called O1, which could be controlled by a first occupancy sensor. Accordingly, the addresses for the light fixtures in the O1 group are set such that those in both the D1 and O1 groups are set to Address 1, and such that those light fixtures in both the O1 and D4 groups are set to Address 13.

Similarly, it may be advantageous or desired to control some of the light fixtures in groups D1 through D4 together in a group called O2, which could be controlled by a second occupancy sensor. Accordingly, the addresses for the light fixtures in the O2 group are set such that the light fixtures in both the D1 and O2 groups are set to Address 17, such that those in both the O2 and D2 groups are set at Address 21, such that those in both the O2 and D4 groups are set to Address 29, and such that those in both the O2 and D3 groups are set at Address 25.

Finally, it may be advantageous or desired to control some of the light fixtures the D2 group and some of the light fixtures in the D3 group together in a group called O3, which could be controlled by a third occupancy sensor. Accordingly, the addresses for the light fixtures in O3 are set such that the light fixtures in both the D2 and O3 groups are set to Address 37 and such that those in the O3 and D3 groups are set to Address 41. In this manner, each of the light fixtures can be properly controlled in the manner desired even when all the light fixtures may be powered on one or more channels. This control is provided by setting the individual address of each FCM to be "zoned" as desired.

As above, if the light fixtures have multiple color channels, each light fixture can be assigned multiple addresses, as set forth in Table 1.

Optionally, in any configuration, some or all of the sensors could be incorporated into the light fixtures and/or can receive power over the low-voltage wiring providing power to the light fixtures. Similarly, the sensors may transmit and/or receive control signals to/from the DPM over the low-voltage wiring and/or wirelessly, in which case the sensors could be assigned a unique address and use the same digital control protocol as the FCMs, or a different protocol, and the DPM would be configured to receive and process the inputs in the manner described above.

On example of a signal protocol that could be used to control the various light fixtures is Digital Multiplex (DMX), such as DMX512 which is a standard for digital communication networks. Such a signal (or a different protocol) could be transmitted wirelessly between the DPM and FCMs. For example, a transmitter could be centrally positioned to wirelessly transmit the control signals to receivers located in the light fixtures/FCMs. It is further contemplated that the light fixtures could be adapted to transmit data to the DPM, which in turn, could be connected to a network connection to transmit data relating to the light fixture(s) (whether individual light fixtures or groups of light fixtures) to a remote computer. This data could comprise any number of different information including, for example, but not limited to, the operation of the light fixture, a maintenance needed signal, a status of the light fixture and an efficiency of the light fixture. This information could be used to inform personnel of needed maintenance, or it could be used to determine power usage, or it could be used for enhanced control of the distributed lighting system.

Although the invention has been described with reference to a particular arrangement of parts, features and the like, these are not intended to exhaust all possible arrangements or features, and indeed many other modifications and variations will be ascertainable to those of skill in the art.

What is claimed:

1. A system for distributed lighting control comprising:
    a digital power module configured to connect to a source of electrical power, said digital power module having:
        a processor connected to a non-transitory storage;
        a plurality of 0-10 volt inputs;
        a plurality of occupancy sensor inputs;
        at least one digital output;
    a first fixture control module including:
        an input;
        a first color channel having a first lighting element;
        said first color channel being addressable to any one of a plurality of addresses from a set of predefined addresses;
    said digital power module being adapted to send output control signals to said input of said first fixture control module to control the first lighting element, in response to input control signals received over said inputs of said digital power module; and
    said digital power module having a first mode wherein said processor is configured to address said output control signals according to a first address table in said storage, where said first address table has a unique address from said set of predefined addresses for each unique combination of (a) said plurality of 0-10 volt inputs and (b) said plurality of occupancy sensor inputs.

2. The system according to claim 1, wherein:
    said first fixture control module has a plurality of color channels each having a lighting element;
    each of said plurality of color channels being addressable to a unique one of said set of predefined addresses; and
    said first address table has a unique address from said set of predefined addresses for each unique combination of (a) said plurality of 0-10 volt inputs, (b) said plurality of occupancy sensor inputs, and (c) said plurality of color channels.

3. The system according to claim 2, wherein:
said plurality of 0-10 volt inputs comprises four 0-10 volt inputs;
said plurality of occupancy sensor inputs comprises three occupancy sensor inputs;
said plurality of color channels comprises four color channels; and
said first address table comprises 48 unique addresses, wherein each one of said 48 unique addresses corresponds to a unique combination of (a) said four 0-10 volt inputs, (b) said three occupancy sensor inputs, and (c) said four color channels.

4. The system according to claim 3, wherein the four color channels correspond to Red, Green, Blue, and White light, respectively.

5. The system according to claim 2, wherein:
said fixture control module includes an address selector having a plurality of positions and in each of said plurality of positions said address selector is operable to set a unique address for each of said plurality of color channels, from said set of predetermined addresses.

6. The system according to claim 1, wherein:
said plurality of 0-10 volt inputs includes a plurality of pairs of 0-10 volt inputs; and
said digital power module has a second mode wherein said processor is configured to address said output control signals according to a second address table in said storage, where said second address table has a unique address from said set of predefined addresses for each unique combination of (a) said plurality of pairs of 0-10 volt inputs and (b) said plurality of occupancy sensor inputs.

7. The system according to claim 6, wherein:
said fixture control module has a plurality of color channels each having a lighting element;
each of the plurality of color channels being addressable to a unique one of set of predefined addresses; and
said second address table has a unique address from said set of predefined addresses for each unique combination of (a) said plurality of pairs of 0-10 volt inputs, (b) said plurality of occupancy sensor inputs, and (c) said plurality of color channels.

8. The system according to claim 1, wherein said output of said digital power module comprises a wireless transmitter and said input of said fixture control module comprises a wireless receiver.

9. The system according to claim 1, wherein said processor in said digital power module is selected from the group consisting of: a microprocessor, a field programmable gate array, a digital signal processor, a microcontroller and combinations thereof.

10. The system according to claim 1, wherein said processor in said fixture control module is selected from the group consisting of: a microprocessor, a field programmable gate array, a digital signal processor, a microcontroller and combinations thereof.

11. The system according to claim 1, further comprising:
a second fixture control module including:
an input;
a second color channel having a second lighting element;
said second color channel being addressable to any one of a plurality of addresses from a set of predefined addresses;
said digital power module being adapted to send output control signals to said inputs of said first and second fixture control modules to control the first and second lighting elements, in response to input control signals received over said inputs of said digital power module.

12. The system according to claim 1, further comprising a central controller connected to the digital power module via a network connection.

13. A system for distributed lighting control comprising:
a digital power module configured to connect to a source of electrical power, said digital power module having:
a processor connected to a non-transitory storage;
a plurality of inputs;
at least one digital output;
a first fixture control module including:
an input;
a first color channel having a first lighting element;
said first color channel being addressable to any one of a plurality of addresses from a set of predefined addresses;
said digital power module being adapted to send output control signals to said input of said first fixture control module to control the lighting element, in response to input control signals received over said inputs of said digital power module; and
said digital power module having a first mode wherein said processor is configured to address said output control signals according to a first address table in said storage, where said first address table has a unique address from said set of predefined addresses for each unique combination of said plurality of inputs.

14. The system according to claim 13, wherein:
said digital power module is operable to sense a plurality of connected inputs from among said plurality of inputs, where each said connected input has an input control connected thereto;
said digital power module is configured to send an independent output signal to each of a plurality of valid addresses from said first address table, where each valid address corresponds to one of said unique combinations of said plurality of connected inputs; and
each said independent output signal is based on input control signals received over inputs corresponding to an associated one of said unique combinations of said plurality of connected inputs.

15. The system according to claim 14, wherein:
said digital power module is configured to send said output signals only to said plurality of valid addresses.

16. The system according to claim 13, wherein:
said first fixture control module has a plurality of color channels each having a lighting element;
each of said plurality of color channels being addressable to a unique one of said set of predefined addresses; and
said first address table has a unique address from said set of predefined addresses for each unique combination of (a) said plurality of inputs and (b) said plurality of color channels.

17. The system according to claim 16, wherein:
said digital power module is operable to sense a plurality of connected inputs from among said plurality of inputs, where each said connected input has an input control connected thereto;
said digital power module is configured to send an independent output signal to each of a plurality of valid addresses from said first address table, where each valid address corresponds to one of said unique combinations of (a) said plurality of connected inputs and (b) said plurality of color channels; and
each said independent output signal is based on input control signals received over inputs corresponding to an associated one of said unique combinations of said plurality of connected inputs.

18. The system according to claim 13, wherein:
said plurality inputs includes a plurality of pairs of inputs and a plurality of individual inputs; and
said digital power module has a second mode wherein said processor is configured to address said output control signals according to a second address table in said storage, where said second address table has a unique address from said set of predefined addresses for each unique combination of (a) said plurality of pairs of inputs and (b) said plurality of individual inputs.

19. The system according to claim 18, wherein:
said first fixture control module has a plurality of color channels each having a lighting element;
each of the plurality of color channels being addressable to a unique one of set of predefined addresses; and
said second address table has a unique address from said set of predefined addresses for each unique combination of (a) said plurality of pairs of inputs, (b) said plurality of individual inputs, and (c) said plurality of color channels.

20. The system according to claim 13, further comprising a central controller connected to the digital power module via a network connection.

* * * * *